US008432896B2

(12) United States Patent
Foster et al.

(10) Patent No.: US 8,432,896 B2
(45) Date of Patent: Apr. 30, 2013

(54) SYSTEM AND METHOD FOR OPTIMIZING COMMUNICATIONS BETWEEN SESSION BORDER CONTROLLERS AND ENDPOINTS IN A NETWORK ENVIRONMENT

(75) Inventors: William R. Foster, Nanaimo (CA); Jonathan D. Rosenberg, Freehold, NJ (US)

(73) Assignee: Cisco Technology, Inc., San Jose, CA (US)

( * ) Notice: Subject to any disclaimer, the term of this patent is extended or adjusted under 35 U.S.C. 154(b) by 1556 days.

(21) Appl. No.: 11/188,166

(22) Filed: Jul. 22, 2005

(65) Prior Publication Data
US 2007/0019619 A1    Jan. 25, 2007

(51) Int. Cl.
*H04L 12/66* (2006.01)
(52) U.S. Cl.
USPC ........... 370/352; 370/392; 370/401; 370/466; 370/260
(58) Field of Classification Search .................... 370/352
See application file for complete search history.

(56) References Cited

U.S. PATENT DOCUMENTS

| | | | | |
|---|---|---|---|---|
| 6,614,781 | B1 | 9/2003 | Elliott et al. | 370/352 |
| 6,741,585 | B1 | 5/2004 | Munoz et al. | 370/352 |
| 6,768,726 | B2 | 7/2004 | Dorenbosch et al. | 370/331 |
| 6,781,982 | B1 | 8/2004 | Borella et al. | 370/352 |
| 6,831,969 | B2 | 12/2004 | Ju | 379/142.16 |
| 6,980,526 | B2 | 12/2005 | Jang et al. | |
| 2004/0244010 | A1* | 12/2004 | Kleyman et al. | 719/318 |
| 2005/0008024 | A1* | 1/2005 | Newpol et al. | 370/401 |
| 2005/0259637 | A1* | 11/2005 | Chu et al. | 370/352 |
| 2006/0209794 | A1* | 9/2006 | Bae et al. | 370/352 |
| 2007/0019622 | A1* | 1/2007 | Alt et al. | 370/352 |
| 2007/0036143 | A1* | 2/2007 | Alt et al. | 370/352 |

OTHER PUBLICATIONS

Newport Networks, "The Need for a Carrier Class Session Controller," 10 pgs.
Newport Networks, "Session Border Controllers and 3GPP White Paper," 12 pgs.
Newport Networks, "The Role of Session Border Controllers in Carrier-Class VoIP Networks," China VoIP Conference, 29 pgs., May 2005.
Notification of Transmittal of the International Search Report and the Written Opinion of the International Searching Authority,or the Declaration, International Application No. PCT/US2006/027950, mailed Nov. 23, 2006, 11 pages.
Sohel, et al., "Conceptual Deployment Scenarios of Session/Border Controls (S/BC) Functions," Jul. 8, 2005, *Sipping Working Group*, 14 pages.
Constantinescu, et al., "NAT/Firewall Traversal for SIP: Issues and Solutions," 2005, *IEEE*, pp. 521-524.
Rosenberg, et al., "Traversal Using Relay NAT (TURN)," Feb. 21, 2005, *NIDCOM*, 32 pages.

* cited by examiner

*Primary Examiner* — Asad M Nawaz
*Assistant Examiner* — Jason Harley
(74) *Attorney, Agent, or Firm* — Baker Botts L.L.P.

(57) ABSTRACT

An apparatus for optimizing communications between session border controllers in a network environment is provided that includes a session border controller (SBC) operable to communicate with a first endpoint and a second endpoint. The SBC is also operable to communicate with a data path border element (DBE) and a signaling path border element (SBE). The DBE is operable to provide a media relay for a communication session involving the endpoints, the media relay being invoked by either of the endpoints using a traversal using relay network address translation (TURN) protocol, which allows the SBC to operate in either of two modes depending on protocol support present in the endpoints.

21 Claims, 2 Drawing Sheets

SYSTEM AND METHOD FOR OPTIMIZING COMMUNICATIONS BETWEEN SESSION BORDER CONTROLLERS AND ENDPOINTS IN A NETWORK ENVIRONMENT

TECHNICAL FIELD OF THE INVENTION

This invention relates in general to the field of communications and, more particularly, to a system and a method for optimizing communications between session border controllers and endpoints in a network environment.

BACKGROUND OF THE INVENTION

Networking architectures have grown increasingly complex in communications environments. In addition, the augmentation of clients or end users wishing to communicate in various network environments has caused many networking configurations and systems to respond by adding elements to accommodate the increase in networking traffic and the various enhancements that have been provided by numerous communicative platforms. In recent years, a series of protocols and architectures have been developed in order to accommodate a diverse group of end users having various needs.

Session border controllers (SBCs) generally use media relays in order to provide virtual private network (VPN)-interconnect, network address translation (NAT) traversal, topology hiding, and other functionalities. They provide their own (proprietary) media optimization mechanism for ensuring that relays are not inserted when they should not be.

An alternative approach to these operations is for endpoints to support an interactive connectivity establishment (ICE) methodology that makes use of a traversal using relay NAT (TURN) protocol, and simple traversal of UDP over NATs (STUN) protocol, and to have TURN and STUN servers in the network. There are two related problems that these arrangements implicate. The first problem relates to how to ensure that these two approaches are able to inter-work in a system that provides both SBCs and that has endpoints that support ICE/TURN/STUN. The second problem relates to media optimization in systems where some endpoints support ICE/TURN/STUN and others do not.

Accordingly, the ability to provide an effective mechanism to properly process, coordinate, and direct communications that implicate SBCs offers a significant challenge to network operators, component manufacturers, and system designers alike.

SUMMARY OF THE INVENTION

From the foregoing, it may be appreciated by those skilled in the art that a need has arisen for an improved communications approach that provides for appropriate protocol integration procedures in offering optimal services and capabilities to an end user. In accordance with one embodiment of the present invention, a system and a method for achieving optimal interworking amongst session border controllers and endpoints are provided that greatly reduce disadvantages and problems associated with conventional techniques.

According to one embodiment of the present invention, an apparatus is provided for optimizing communications between session border controllers in a network environment that includes a session border controller (SBC) operable to communicate with a first endpoint and a second endpoint. The SBC may be thought of consisting of a data path border element (DBE) and a signaling path border element (SBE). The DBE is operable to provide a media relay for a communication session involving the endpoints, the media relay may be invoked by endpoints using a traversal using relay network address translation (TURN) protocol or by an SBE on behalf of the endpoint in the case where the endpoint does not support ICE and TURN, which allows the SBC to operate in either of two modes depending on protocol support present in the endpoints.

Certain embodiments of the present invention may provide a number of technical advantages. For example, according to one embodiment of the present invention a communications approach is provided that allows for enhanced services and capabilities to be provided to an end user. This is a result of enabling the SBCs to interoperate with endpoints that execute interactive connectivity establishment/traversal using relay NAT (ICE)/(TURN). Additionally, the present invention may provide media optimization for cases where one or both endpoints do not support ICE.

These benefits may be realized by allowing the media relay function to be invoked by either of two mechanisms: 1) from the SBC itself; or 2) as a TURN request. Behaving as a TURN server offers the advantage of providing an additional functionality beyond that of a traditional TURN server (e.g. VPN interconnect). Details associated with these significant features are discussed more fully below.

Note that certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS OF THE INVENTION

Figure 1:
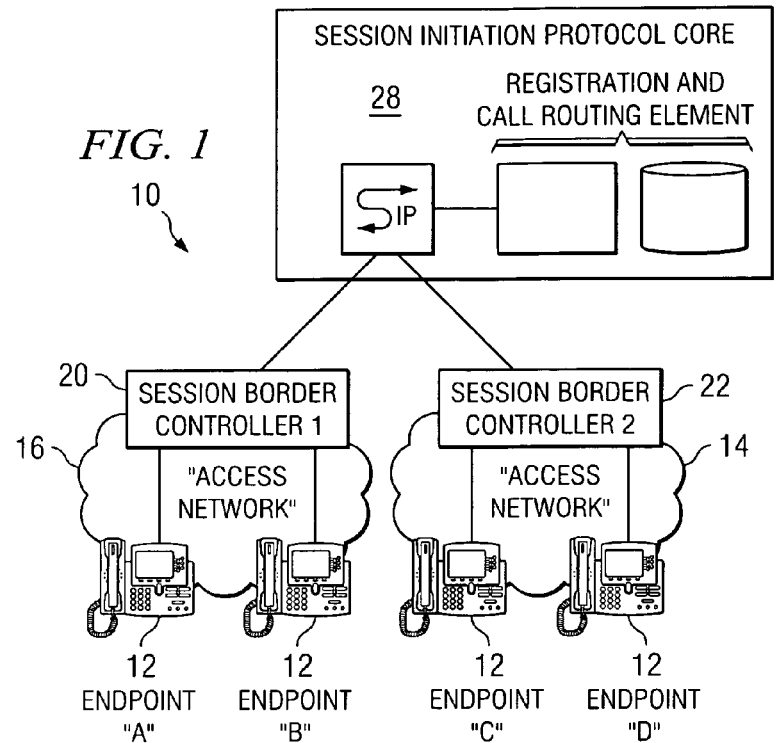
FIG. 1 is a simplified block diagram of a communication system for optimizing communications between session border controllers and endpoints in a network environment in accordance with one embodiment of the present invention.

FIG. 1 is a simplified block diagram of a communication system 10 for optimizing communications between session border controllers and endpoints in a network environment in accordance with one embodiment of the present invention. Communication system 10 may include a number of endpoints (A-D) 12 and a set of corresponding access networks 14 and 16. Communication system 10 may also include a pair of session border controllers (SBCs) 20 and 22, which can communicate with a serving call session control function (S-CSCF) that is part of a session initiation protocol (SIP) core 28. The S-CSCF can be coupled to a registration and call routing element, as is illustrated in FIG. 1.

In accordance with the teachings of the present invention, communication system 10 offers the ability of SBCs 20 and 22 to operate in either of two modes at a given point in time and, further, to provide inter-operability and media optimization in scenarios where one mode is used for one end of the session and the other mode is used for the other end of the session.

The two modes are as follows: 1) in the first mode, a given SBC operates normally, inserting the media relay as required; and 2) in the second mode, the data path part (i.e. the data path bordering element [DBE]) is disaggregated from the SBC and, thus, can be configured to behave like a simple traversal using relay network address translation (NAT) (TURN) server. The signaling part of the SBC (i.e. the signaling path border element [SBE]) takes on the job of doing media optimization for cases where one or both endpoints do not support the interactive connectivity establishment (ICE) methodology.

Note that a traditional TURN server is a media relay that sits in the public address space with the sole purpose of enabling NAT traversal (specifically for symmetric NATs). In this case, all of the functions that can be provided in the data path (DBE) portion of an SBC may be included with the TURN server. Other functions may also be provided for by communication system 10 such as using the TURN server to provide VPN interconnect (e.g. between an enterprise virtual private network (VPN) and a service provider VPN that provides shared resources). These operations, and others, are described in greater detail below with references to the subsequent FIGURES.

For purposes of teaching and discussion, it is useful to provide some overview as to the way in which the following invention operates. The following foundational information may be viewed as a basis from which the present invention may be properly explained. Such information is offered earnestly for purposes of explanation only and, accordingly, should not be construed in any way to limit the broad scope of the present invention and its potential applications.

Simple traversal of UDP over NATs (STUN) is a network protocol that helps many types of software and hardware receive UDP data properly (e.g. through home broadband routers that use network address translation (NAT)). TURN is a simple protocol that allows for an element behind a NAT or firewall to receive incoming data over TCP or UDP connections. It is most useful for elements behind symmetric NATs or firewalls that wish to be on the receiving end of a connection to a single peer. TURN generally does not allow for users to run servers on well-known ports if they are behind a NAT; it supports the connection of a user behind a NAT to only a single peer.

SBCs are widely used at peering interfaces with increasing interest in their use at the access. The ICE/TURN/STUN approach is in many ways a better approach. However, in order to get full benefit (e.g. media optimization), both endpoints in a session need to support it. This approach provides an evolution path. It also suggests the use of TURN servers with more value (e.g. by including all of the capabilities of SBC data path functions such as VPN inter-connect). There have generally been two groups (i.e. schools of thought) who diverge in their strategies as they pertain to optimal SBC management: those who support ICE/TURN/STUN as the solution and those who believe that SBCs provide the best solution. No implementations have attempted to provide a solution for hybrid networks (i.e. networks that consist of some mixture of ICE/TURN/STUN usage in conjunction with SBCs).

For networks consisting of some endpoints that support ICE and others that do not, the solution that ICE provides is that the default address used is the address that is most likely to work (i.e. the TURN address). However, this provides no media optimization so that in the case where one endpoint does not support ICE, media optimization is not done. The approach offered by communication system 10 allows for that media optimization to be done for cases where one or more endpoints do not support ICE. For those cases, the SBC provides the optimization but allows the endpoints to handle it if they do support ICE.

One approach to solve many of the problems associated with optimal SBC communication is for endpoints to support the ICE methodology, the TURN protocol, and the STUN protocol, and to have TURN and STUN servers in the network. There are two related problems that such operations implicate. The first problem relates to how to ensure that these two approaches are able to inter-work in a system that provides both SBCs and that has endpoints that support ICE/TURN/STUN. The second problem relates to media optimization in systems where some endpoints support ICE/TURN/STUN and others simply do not.

Note that push-type mechanisms (e.g. packet/cable dynamic quality of service (DQOS), packet cable multimedia, SBCs, etc.) solve some problems but introduce others. For example, if a media relay is used, the media is forced to go through a specific node. This can result in poor voice quality due to larger delays (unnecessarily long media paths), as well as poor use of resources (e.g. a media path crossing a bandwidth limited WAN link unnecessarily). Additionally, if a media relay is not used (i.e. the media is allowed to follow its normal path), one of the key problems that is introduced is how to find the appropriate device along the data path (i.e. how does the signaling device know which path the media will follow). Another question relates to how SBC mechanisms interact with endpoint-based methods for doing NAT traversal (STUN, TURN, ICE, etc).

In addition, there are some deployment scenarios where SBCs are problematic. One such scenario is the deployment of call application platforms (e.g. a Call Manager platform, which is manufactured by Cisco Systems, Inc. of San Jose, Calif.). SBCs with media relays make a basic assumption that the media path will follow the signaling path. This does not hold true for call applications controlling endpoints in a different site (behind a different SBC).

In the context of NAT traversal and media relay issues, there are a number of salient concerns. For example, in the case of media relay concerns, the media relays are introduced for a variety or reasons: 1) topology hiding (normally only of concern at the SP⇔SP interface); 2) NAT at the access boundary; and 3) VPN inter-connect. However, many of these items result in the problems in increased media delays if the relay is introduced unnecessarily.

Consider a case where the service provider (SP) network (SIP-Core) is connected to one or more peering networks. A call from outside enters the SP network and is forwarded back to the same or a different peer. Phones implicated in such a transaction could be in New Jersey and the SBCs and serving call session control function (S-CSCF) could reside in California. If the SBCs introduce media relays, the media path could end up going from New Jersey to California and back to New Jersey, which would yield poor call quality because of the unnecessarily long media path.

Referring back now to FIG. 1, consider the case where the SBCs are at the access, providing a NAT function or VPN interconnect function via a media relay. The lines shown from the endpoints (A, B, C and D) to the SBCs could be across a WAN link that has limited bandwidth. Hence, an operator would not want to introduce a media relay when endpoint A is calling endpoint B, for example. In addition, in the case where the SBC is providing a VPN interconnect, an operator would not want to introduce a media relay if the source and destination of a media flow are within the same VPN. The above issue is true of any hosted SP VoIP service (where call control is in the SP network), whether the endpoints are SIP endpoints, media gateway control protocol (MGCP) endpoints, or SCCP endpoints. Before turning to FIG. 2, the elements provided in FIG. 1 are detailed for purposes of explanation and clarity. Once described, the audience is directed to more substantial discussions involving the operations of the components of FIG. 1.

Endpoints 12 each represent an end user, a client, or a customer wishing to initiate a communication or participate in a communication session in communication system 10. Endpoints 12 may be inclusive of devices used to initiate (or participate in) a communication, such as a computer, a personal digital assistant (PDA), a laptop or an electronic notebook, a telephone, a mobile station, an audio IP phone, a video phone appliance, a personal computer (PC)-based video phone, a streaming client, a SIP-enabled telephone of any kind, or any other device, component, element, or object capable of initiating voice, video, or data exchanges within communication system 10. Endpoints 12 may also be inclusive of a suitable interface to the human user, such as a microphone, a display, a keyboard, a whiteboard, a video-conferencing interface or bridge, or other terminal equipment.

Endpoints 12 may also be any device that seeks to initiate (or participate in) a communication on behalf of another entity or element, such as a program, a database, an application, a piece of software, or any other component, device, element, or object capable of initiating a voice, a video, or a data exchange within communication system 10. Data, as used herein in this document, refers to any type of numeric, voice and audio, video, audio-visual, or script data, or any type of source or object code, or any other suitable information in any appropriate format that may be communicated from one point to another.

Access networks 14 and 16 represent virtual private networks (VPNs) in one embodiment. The VPN can serve one or more individuals and, further, offer connectivity to any number of devices (e.g. business telephones PDAs, personal computers, etc.). Access networks 14 and 16 are coupled to SIP core 28 in order to offer additional services and capabilities to a group of end users. In other embodiments, access networks 14 and 16 are local area networks (LANs), wireless LANs (WLANs), metropolitan area networks (MANs), wide area networks (WANs), or any other suitable architecture that offers connectivity to a group of end users.

SBCs 20 and 22 are elements that can facilitate communications via the access network and that involve one or more endpoints 12. SBCs 20 and 22 may be routers, gateways, bridges, processors, servers, switches, or any other element that is operable to manage, direct, route, switch, or otherwise affect one or more packets of information that propagate in the network. In one embodiment, each SBC includes a signaling path border element (SBE) and a data path border element (DBE). However, either or both of these elements may be provided external to SBCs 20 and 22.

In accordance with a particular embodiment of the present invention, a given SBC includes software operable to execute operations (as outlined herein) to achieve the teachings of the present invention in achieving optimal interworking amongst SBCs and endpoints. Alternatively, other elements could be used or leveraged within the architecture of the SBC, where appropriate, in order to address particular configuration needs. For example, either the SBE or the DBE may include such software to militate or yield these results. Instead of being provided in software, these improved functions may be provided in any suitable hardware, processor, application program interface (API), application specific integrated circuit (ASIC), object, module, algorithm, erasable programmable read only memory (EPROM), electronically erasable programmable read only memory (EEPROM), or provided in any other suitable element based on particular communication needs.

In certain applications or environments, any one or more of the functionalities of the SBC may be provided external thereto (or the DBE and/or the SBE may be provided external to the SBC). The elements included in the SBC (or provided external thereto) may be reflective of accommodations being made for a particular type of communications protocol or plan, a distributed architecture, or based on selected performance or service parameters. Additional details related to these components are provided below with reference to accompanying FIGURES.

For SBCs and endpoints that support ICE/TURN, the DBE can work as a TURN server, allowing endpoints that do support TURN and ICE to work. Consider the following example, non-limiting scenarios, which are used for purposes of teaching only:

a) Call from an endpoint that supports ICE/TURN to another endpoint that supports ICE/TURN:
   Endpoint does TURN (DBE acts as a TURN server).
   Endpoint sends addresses as per ICE.
   SBE (signaling part of SBC) sees ICE is supported and transparently allows the address to pass.
   The same happens at the other end.
   Endpoints act as STUN servers/clients as per ICE and choose the appropriate addresses to use for communication.

b) Call from an endpoint that supports ICE/TURN to one that does not:
   Endpoint does TURN (DBE acts as a TURN server).
   Endpoint sends addresses as per ICE.
   SBE (signaling part of SBC on originating side) sees that ICE is supported and transparently allows the address to pass.
   SBC at terminating side looks at the relayed address and determines the originating realm (the alternative to this is the SBE on the originating side would have had to add the realm ID).
   The SBC at the terminating side chooses the appropriate address and sends it to the endpoint (based on realm-realm policy).
   When the SBC at the terminating side gets the "answer," it decides if a relay is required and sends the appropriate address to the originating side.
   STUN of course will not be used (even though the endpoint doing ICE will set itself up as a STUN server—no STUN request will be made, the address choice being made by the SBC instead).

c) Call from an endpoint that does not support ICE/TURN to one that does. This will work the same as the case where neither endpoint supports ICE/TURN d) Neither endpoint supports ICE/TURN: SBCs do the determination of whether or not to insert a relay on behalf of the endpoint and pick the appropriate addresses based on realm-realm policy.

Note that endpoints that are in the SP network in the public address space (not behind an SBC) typically do not have to support ICE/TURN. They simply use the default address provided (TURN address) and provide their own public media address to the other end.

Figure 2:
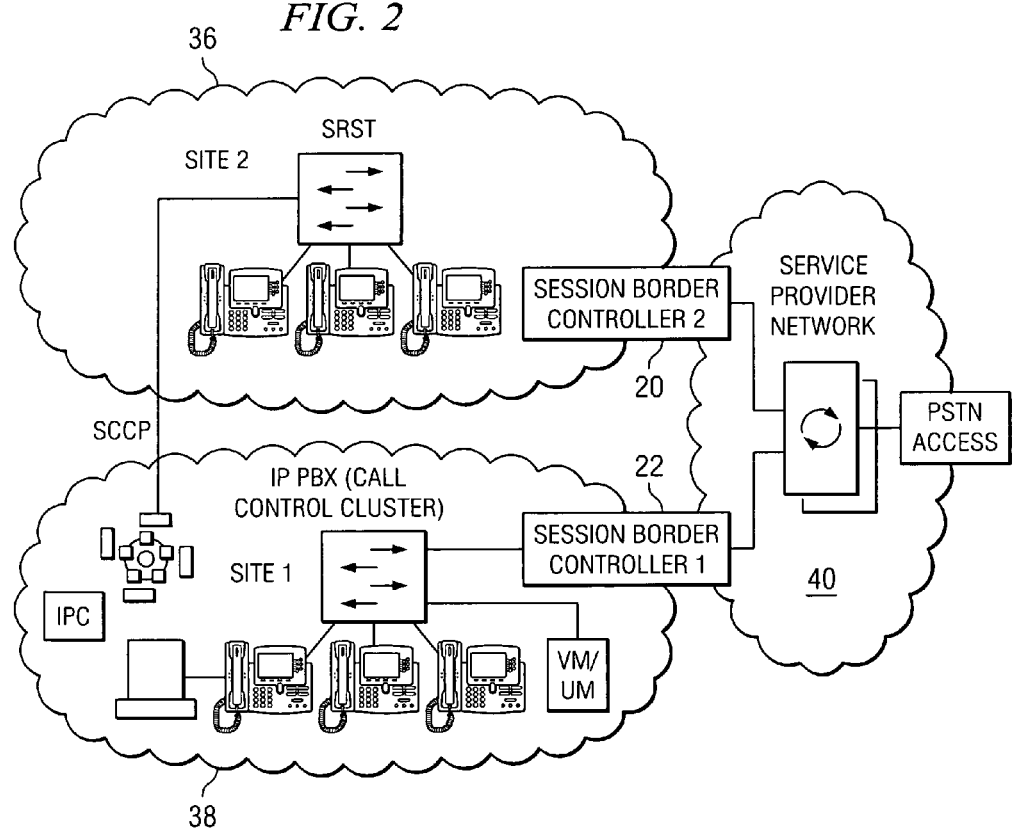
FIG. 2 is a simplified block diagram of an example architecture that may be provided in conjunction with the communication system in accordance with one embodiment of the present invention.

FIG. 2 is a simplified block diagram of an example architecture that may be provided in conjunction with communication system 10 in accordance with one embodiment of the present invention. FIG. 2 illustrates a call control application example that includes a Site 1 38 and a Site 2 36, which offers a survivable remote site telephony (SRST) platform. FIG. 2 also includes a service provider (SP) network 40 that is coupled to Sites 36 and 38 via SBCs 20 and 22. Site 1 includes a call control cluster that has a connection to Site 36. Site 38 may also include an IP communications (IPC) component and a voice messaging/unified messaging (VM/UM) component. Site 38 may support any communications platform (e.g. SIP, H.323, etc.) where appropriate and be based on particular needs.

Note that the call control of Site 1 represents communications equipment or a communications platform, including hardware and any appropriate controlling logic, for providing telephony services over a network. For example, the call control may support VOIP communications, using any of various protocols such as SIP, SCCP protocol, media gateway control protocol (MGCP), H.323, and/or any other appropriate protocol for VOIP. Furthermore, the call control may readily act as an IP PBX and support PBX functions.

In the example of FIG. 2, the SP is providing a public switched telephone network (PSTN) interconnect for an enterprise that has multiple sites. Some sites use a call control application and others have an SRST (survivable remote site telephony), where the phones in that site are normally controlled by a call control application in a different site.

In operation of an example scenario, consider a case where a call is made from a phone in Site 2 to the PSTN. A call control of Site 1 is controlling the phone in Site 2 via SCCP and the signaling to the SP is via SIP or H.323 via SBC1. If SBC1 inserts a media relay, the media will have to flow from the phone in Site 2 to SBC1 and then to the PSTN access gateway in the SP network. For example, the PSTN gateway and Site 2 could be in New Jersey and Site 1 could be in California. The media would then flow from New Jersey to California and back.

In this example, a media relay may be required in order to provide media access by an enterprise to services such as PSTN access provided by the SP network, since the relay may provide a way to interconnect the enterprise VPN in a site with the SP VPN. Using an SBC approach, the SBC will force the media to follow the SIP or H.323 signaling that it sees coming from site 1. However, this may result in poor media routing such as from California to New Jersey and back again. Another approach is to allow the media to pick the relay using TURN rather than having the SBC insert the relay. In the example of a PSTN call from an IP phone in site 2 of FIG. 2 to the PSTN, the IP phone would use TURN to insert a relay at SBC 20. As a result, although the signaling between the call control in site 1 controlling IP phones would signal via SIP or H.323 via SBC 22, the media would take the shorter path via the TURN server in SBC 20. In this case, the endpoints in ICE/TURN and SBC 22 that sees the signaling would not become involved inserting the relay, this leaving it up to the endpoints.

The IP phones shown in site 1 and site 2 may be in the same VPN and within the same address space. Media relays may be required when media goes to a different VPN such as between access networks 36 or 38 and the SP network 40, or with similar access networks in another enterprise. The relay may also be required as a NAT traversal mechanism if each end of the call is behind a NAT and one or other of the NATs is symmetric.

However, for a call between IP phones or gateways within the same VPN/address space, there is no need to insert a relay. In the example in FIG. 2, a call between two IP phones in the same site or between IP phones in different sites but within the same address space or VPN does not require a relay in the media path. There are several ways of solving the problem of deciding whether to insert the relay. One approach to solving this problem is to use SBCs that are topology aware. However, this does not always work as indicated previously. An alternative approach is to make use of STUN, TURN, and ICE. This approach solves all of the problems with a normal NAT and VPN traversal without the problems mentioned previously. However, this approach does require endpoint support for STUN, ICE and TURN.

ICE implicates the concept of realms in its relation to the problem of NAT traversal. The concept is general where a realm may be a VPN, an address space (public or private), or an administrative domain (SP, enterprise, peer). Media relays are introduced in the media path of SBCs as a mechanism for NAT traversal, VPN interconnect, and topology hiding between administrative domains. SBCs can solve the media optimization problem by determining what the originating and destination realm is and based on that, they apply the appropriate policy as to whether media optimization is done or not. For example, if a call is going from realm X/SBC1 to realmY/SBC2, the SBCs both need to know: 1) which realms are being interconnected; 2) what the policy is for media optimization; and 3) what the media addresses with and without the relay. SBCs can maintain a matrix of realm IDs for all the realms that it can communicate with and the policy associated with those inter-connections.

In operation of an example embodiment, one function provided by SBCs 20 and 22 is a media relay function for VPN interconnect, NAT traversal, address/topology hiding, and other purposes. Media optimization (removing the relay) can be done by passing candidate addresses and realm information between SBCs and making the decision as to which address to choose based on the realm information that is passed. Typically this information is passed via a non-standard SDP attribute since this is more likely to be passed end-to-end rather than including it in any other type of signaling (e.g. SIP).

An alternative approach is a media optimization approach based on ICE. This also passes candidate addresses in the SDP but does not include realm information. Instead, media optimization is done by a combination of the use of STUN to determine reachability, and, making use of candidate address preferences in the SDP itself. Comparing the two media optimization approaches reveals that SBCs typically make media-optimization decisions based on realm identifiers that they pass end-to-end. This approach depends on the SBC's ability to identify the realm. In those cases where this is possible, the SBC approach works within the scope of the set of SBCs that understand the particular realm identifiers being passed and the format being used for passing them (e.g. the SDP attribute).

The ICE solution works in the more general case since it does not depend on the ability to define and identify realms. In order for complete media optimization to occur, however, both ends have to support ICE, otherwise the default (typically the TURN) address will be used. Current SBC implementations do not support endpoints that do ICE/TURN/STUN. The assumption with SBC implementations currently is that ICE/TURN/STUN is not used. As a result, an individual is left with two possible solutions, which do not interwork with each other (i.e. an SBC solution that works within a limited scope, and, a more general solution using ICE, which requires both endpoints to support ICE for media optimization to occur).

The basis of communication system 10 is to allow these two approaches to work in conjunction with each other such that SBCs only handle the media optimization for those cases where one or both endpoints do not support ICE. Otherwise, ICE/TURN/STUN is used.

Figure 3:
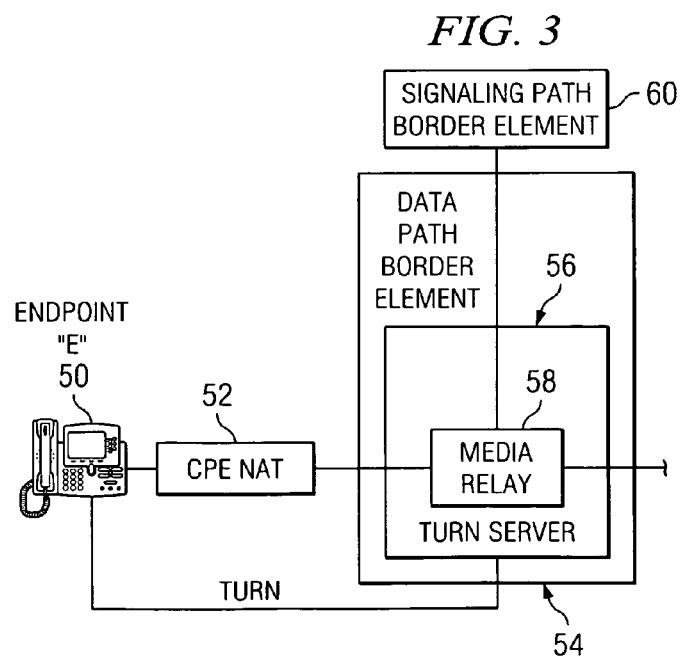
FIG. 3 is a simplified block diagram of an example arrangement for achieving an optimization in communications between session border controllers and endpoints in a network environment in accordance with one embodiment of the present invention.

FIG. 3 is a simplified block diagram of an example arrangement for achieving cooperation between session border controllers and endpoints in a network environment in accordance with one embodiment of the present invention. FIG. 3 includes an endpoint E 50, which is coupled to customer premises equipment (CPE) NAT 52 that is coupled to a data path border element (DBE) 54. Within DBE 54 is a TURN server 56, which comprises a media relay 58. DBE 54 is coupled to a signaling path border element (SBE) 60. (Note that both the DBE and the SBE may be included in a given SBC or provided external thereto where appropriate. Moreover, the SBE and the DBE could be embodied in a SIP proxy, a call agent, or any other device in accordance with particular needs. Moreover, these elements can be combined or provided separately.)

One of the functions of the DBE is a media relay, which is normally inserted by the SBE via a control interface. In accordance with the present invention, the media relay function can also be invoked by the endpoint using TURN, allowing the SBC to operate in either of two modes depending on endpoint support (i.e., the DBE can act like a TURN server if the endpoint supports that).

If both endpoints support ICE/TURN, the DBE acts as a TURN server and the SBC allows the endpoints to handle the media optimization. If one or both endpoints do not support ICE/TURN, the SBC inserts the relay as required and provides the media optimization for any such scenarios. This provides a better solution for those scenarios than would be available if the SBC was not there, since those situations would have otherwise resulted in the media not being optimized.

This allows systems to evolve from a situation where no endpoints support ICE/TURN/STUN to systems where all endpoints support ICE/TURN/STUN. It also allows hybrid systems to be built where both approaches coexist, i.e. where the same problem (NAT traversal, VPN interconnect etc.) is solved one way in part of the system (ICE/TURN/STUN) and in another way in another part of the system (SBCs).

Thus, the present invention can leverage SBCs consisting of an SBE and a DBE. In cases where VPN interconnect, NAT and NAT traversal and topology hiding are required, a media relay is introduced within the DBE. Media optimization is required based on policy to avoid the problems of: 1) poor voice quality due to long delays caused by unnecessarily anchoring the media path when it could go direct (and may not touch the SP network); and 2) bandwidth over-utilization caused by anchoring the media path such that the media has to make unnecessary crossings of limited bandwidth links (e.g. WAN links).

Two solutions to this problem are: 1) the SBCs do the optimization based on policy for realm-realm inter-connect (this makes the assumption that the signaling and media path (when a relay is inserted) should be the same); and 2) the endpoints do the optimization using ICE (this assumes that the DBE is disaggregated from the SBC in the form of a TURN server).

Note that in the case where SBCs are not used and ICE/TURN/STUN is supported only by some endpoints, a media connection between an endpoint that does have support and one that does not involve a media relay (TURN) and optimization will not occur. In that sense, SBCs provide some value during the interim stages by providing better media optimization.

An intermediate step may be for the SBCs to provide the inter-working between endpoints that do support ICE and ones that do not. In order to support this, the SBC should be able to operate in several modes simultaneously in which:
 The SBE is able to control insertion of the relay for those endpoints that do not support ICE/TURN.
 The DBE acts as a TURN server for those endpoints that support TURN, and
 SBEs are able to provide inter-working and media optimization for cases where one or both endpoints do not support ICE/TURN.

Note that when an SBE is providing the inter-working function, the SBC chooses the address such that STUN is not needed to determine reachability. The following scenarios apply when two endpoints attempt to communicate:
 Two endpoints supporting ICE/TURN/STUN will use the full ICE (with STUN, encrypted signaling etc.) mechanism. A TURN server (DBE) disaggregated from the SBC may be inserted under endpoint control. Because the DBE has other functions, additional policy may be applied based on information supplied to the SBE or policy pull as a result of some trigger.
 Another scenario encountered is when neither endpoint supports ICE/TURN/STUN. In this case, the SBEs insert media relays and do media optimization as required (using realm-realm policy information).
 Another scenario encountered is where one of the two endpoints supports ICE/TURN, while the other does not. In this case, the endpoint that supports ICE/TURN will do STUN and TURN requests and supply the candidate media addresses. However, the SBE will do the optimization and make the address selection.

In addition to the above scenarios, when the DBE portion of the SBC is acting as a TURN server, it provides functions beyond the traditional TURN server provided for the purposes of NAT traversal (it provides all of the functions that can be provided by the DBE portion of an SBC). For example, it may, in addition be a NAT itself, provide a VPN interconnect function, provide address hiding, provide IPV4-IPV6 translation, and offer transcoding, as well as other associated functions that are triggered by a TURN request.

In the context of policy control, DBEs are components that provide a variety of functions, not all of which may be required in a given deployment scenario. The initial assumption is that the SBE will provide direct control of the DBE. However, this assumes one of the following:
 The media path flows through the same SBC; or
 The SBE is able to determine where the media path will flow (which DBE); or
 The SBE forces the media path to flow through a specific DBE by inserting a relay. In this final case, media optimization should be provided to remove the relay for realm-realm interconnects where the relay is not required. (Note that the relay is only inserted when the VPN inter-connect, NAT or topology hiding is required, and the media has to enter the SP realm from outside).

There are cases where, even if a media relay is inserted, an operator may wish the media to follow a different path than that of the signaling. In addition, as more and more endpoints support ICE and TURN, the desire for the SBE to directly control the DBE will disappear.

At the point where the media relay function in the DBE becomes a TURN server when a media relay is required and is disaggregated from SBE, there are two ways to trigger a policy decision from a component (SBE or policy server) in the SP network:

Media relay is not required. In this case, the media follows a path that is based on IP-based routing protocols. The arrival of a PATH message (e.g. RSVP) at the DBE can trigger the request for a policy decision to be applied.

Media relay required: DBE acts as a TURN server. The arrival of a request to commit (e.g. SEND request) can trigger the request for a policy decision to be applied. Alternatively, the TURN server responds with an identifier that the SBE can use to identify (and make a policy request to the DBE).

In cases where the SBE is disaggregated from DBE (as a TURN server), the DBE may operate as more than a TURN server (other functions may need to be invoked, depending on policy). The SBE to DBE becomes a many to many relationship, which means for a given session, the SBE and DBE do not (initially) know about each other and have to (at some point) discover each other in order for policy information to be passed between them (i.e. the SBE that receives the signaling does not know which DBE to push policy at, and the DBE that receives a TURN request does not know which SBE is involved in signaling). There are several possible ways to solve this problem:

1. The TURN server used is identified in the signaling. The SBE can push policy to the DBE/TURN server.

2. Policy pull (from TURN server/DBE to SBE) is triggered by a TURN request, which has enough information in it to identify the SBE.

3. Policy pull is triggered by a PATH request, which has enough information in it to identify the SBE.

4. An intermediary policy server (PS) is used as a rendezvous point (i.e. the SBE sends a unique session identifier to the policy server along with sufficient information such that the PS can apply policy; the trigger at the DBE (TURN request or PATH message) results in a request for policy (policy pull) to the PS. Included is the session-ID, which the PS correlates with the request from the SBE. This assumes either a well-known PS address or that the PS address is supplied with the TURN request).

If other applications (beyond the session-based ones involving the SBE) need to make use of the DBE and apply policy, there may be a need to use the latter approach. Any of the approaches that involve policy pull based on a trigger in the DBE could make use of something such as RFC 3313 to pass a policy object (e.g. RFC 3520). If a TURN or a PATH request is used as the trigger, then information should be supplied in the TURN request. Note that it is possible to have some DBE policy data provisioned locally (e.g. if the TURN server is inserted, DSCP values, etc. are set based on provisioned values, etc.).

Consider a final example that highlights many of the operations discussed above. In this example scenario, there are two endpoints (endpoint A and endpoint B), two SBEs (1 and 2), and two DBEs (1 and 2). Endpoint A and endpoint B are two endpoints that wish to communicate with each other. SBE1 and SBE2 are signaling path elements that may work endpoint separately or in conjunction with the data path elements DBE1 and DBE2. So for example, a media relay within DBE1 and DBE2 can be inserted via some control protocol by SBE1 and SBE2 respectively. This is the SBC approach where SBE1-DBE1 and SBE2-DBE2 are the SBCs. Alternatively, the SBEs and DBEs can work independently from each other if the endpoint supports ICE/TURN. If endpoint A supports TURN it can request the relay in DBE1 to be inserted via TURN and, thus, SBE1 no longer has to provide that function.

There are three basic cases to account for: 1) both endpoint A and endpoint B support ICE/TURN/STUN; 2) only one endpoint supports ICE/TURN/STUN and the other does not; and 3) neither endpoint supports ICE/TURN/STUN. Note that endpoint A and/or endpoint B could be SIP endpoints or could be controlled by SBE1 and SBE2 using some device control protocol such as MGCP, NCS or SCCP. For the purposes of describing the above cases, SIP is assumed in this example. STUN servers may also be used but are not included in the following example.

For Case 1 (where both endpoint A and endpoint B support ICE/TURN/STUN), consider when endpoint A is calling endpoint B: 1) endpoint A does a TURN request (TURN server in DBE1) and sends an INVITE to SBE1 with two candidate addresses in the SDP, the default (TURN) address and a preferred local address; 2) SBE1 adds something to the signaling (e.g. a realm-ID to the SDP) to allow SBC-like optimization to be done if necessary and passes it to SBE2; 3) SBE2 forwards the INVITE to the endpoint; 4) endpoint B does a TURN request and responds with its candidate addresses in the SDP; 5) SBE2 sees that the endpoint supports ICE and as a result just responds back to SBE1 without making any changes to the SDP; 6) SBE2 sees that the other end supports ICE, so it just forwards the response to endpoint A; and 7) endpoint A and endpoint B follow the ICE draft in order to select the correct address to use for sending media.

For Case 2 in a first scenario (endpoint A supports ICE/TURN/STUN but endpoint B does not): 1) endpoint A does a TURN request (TURN server in DBE1) and sends an INVITE to SBE1 with two candidate addresses in the SDP, the default (TURN) address and a preferred local address; 2) SBE1 adds something to the signaling (e.g. a realm-ID to the SDP) to allow SBC-like optimization to be done if necessary and passes it to SBE2; 3) SBE2 either knows that endpoint B does not support ICE, in which case it decides (e.g. based on realm information) whether optimization can occur. If media relays can be optimized out, it modifies the SDP so that the default address is the local address (rather than the TURN address); 4) it does not know whether endpoint B supports ICE/TURN, in which case SBE2 forwards the INVITE to endpoint B unmodified. Since endpoint B does not support ICE/TURN, it only responds with its local address (no other candidates). SBE2 then determines if the media can be optimized out. If yes, it modifies the SDP with endpoint B's local address (rather than TURN address) as the default and does a re-INVITE to endpoint B; 5) when SBE2 gets the final response from endpoint B, it can respond to SBE1 with the appropriate SDP (with a single address candidate) along with information indicating whether optimization is possible or not; and 6) SBE2 responds to endpoint A with the single address. In the case where media optimization can be done, SBE2 may include some signaling so that endpoint A releases its TURN resources and only uses the one address provided.

For Case 2 in a second scenario (where endpoint B supports ICE/TURN/STUN but endpoint A does not): 1) endpoint A sends an INVITE to SBE1 with only its local address (no TURN address); 2) SBE1 sees this and realizes that ICE is not supported by endpoint A, so it inserts a relay and modifies the SDP with the addresses (as per ICE), with the relayed address as the default. It also adds something to the signaling (e.g. a realm-ID to the SDP) to allow SBC-like optimization to be done if necessary and passes it to SBE2; 3) SBE2 sees that the originator does not support ICE, so it decides which address is correct (whether media optimization can be done or not) and passes only one address in the INVITE to endpoint B; and 4) endpoint B does TURN and responds with multiple candidates. SBE2 will modify the SDP so that only one candidate is returned to SBE1 and to endpoint A. (Note in step 3 immediately above, in the case where media optimization can be done, SBE2 may include some signaling to indicate to endpoint B that TURN should not be used and that endpoint B should only respond with its local address). In Case 3 (where neither endpoint supports ICE/TURN/STUN), the SBCs will realize this and do the appropriate SBC-like optimization.

Some of the steps illustrated in the preceding process flows may be changed or deleted where appropriate and additional steps may also be added to the protocols. These changes may be based on specific communication architectures or particular interfacing arrangements and configurations of associated elements and do not depart from the scope or the teachings of the present invention. It is important to recognize that FIG. 3 illustrates just one of a myriad of potential implementations of communication system 10.

Although the present invention has been described in detail with reference to particular embodiments, it should be understood that various other changes, substitutions, and alterations may be made hereto without endpoint departing from the spirit and scope of the present invention. For example, although the present invention has been described with reference to certain steps and tasks to be performed to establish a signaling and a data pathway, these steps may be altered considerably. Communication system 10 is malleable in that any number of processes or procedures may be executed in order to achieve the interworking functionalities as described herein. The example scenarios and configurations have been offered for discussion purposes only and accordingly should be construed as such.

Moreover, although the present invention has been described with reference to a number of elements included within communication system 10, these elements may be rearranged or positioned in any appropriate manner to accommodate any suitable routing configurations. In addition, any of the elements of FIGS. 1, 2, and 3 may be provided as separate external components to communication system 10 or to each other where appropriate. For example, any of the enhanced functionalities of the SBC may be provided external thereto in a single module or component that is operable to execute their operations as identified herein. The present invention contemplates great flexibility in the arrangement of these elements, as well as their internal structure.

Numerous other changes, substitutions, variations, alterations, and modifications may be ascertained to one skilled in the art and it is intended that the present invention encompass all such changes, substitutions, variations, alterations, and modifications as falling within the scope of the appended claims.

What is claimed is:

1. An apparatus comprising:
  a signaling path border element (SBE) operable to:
    receive an INVITE from a first endpoint, the INVITE comprising a preferred local address;
    determine, based on the preferred local address, that the first endpoint supports media optimization;
    generate a signaling message, the signaling message comprising both:
      (a) the preferred local address to allow the first endpoint and a second endpoint to perform the media optimization according to an ICE/TURN/STUN protocol if the second endpoint supports the media optimization; and
      (b) optimization information selected to facilitate performing the media optimization independently of the ICE/TURN/STUN protocol if the second endpoint does not support the media optimization;
    determine whether the second endpoint supports the media optimization based on a response to the signaling message;
    if the first endpoint and the second endpoint support the media optimization, facilitate a data path border element (DBE) to allow the first endpoint and the second endpoint to perform the media optimization according to the ICE/TURN/STUN protocol; and
    if the first endpoint or the second endpoint fail to support the media optimization, facilitate insertion of a media relay into the DBE to perform the media optimization for the first endpoint and the second endpoint, the media relay inserted according to the optimization information and independently of the ICE/TURN/STUN protocol.

2. The apparatus of claim 1, the media optimization comprising an interactive connectivity establishment (ICE) protocol media optimization.

3. The apparatus of claim 1, the network address translation server comprising a traversal using relay network (TURN) address translation protocol server.

4. The apparatus of claim 1, the SBE operable to determine whether the first endpoint supports media optimization by:
  receiving an INVITE from the first endpoint; and
  if the INVITE fails to include a network address translation address, determine that the first endpoint fails to support the media optimization.

5. The apparatus of claim 1, the SBE operable to facilitate insertion of the media relay into the DBE by:
  sending realm information to a second SBE operable to decide from the realm information to insert the media relay.

6. The apparatus of claim 1, the SBE operable to facilitate insertion of the media relay into the DBE by:
  receiving realm information from a second SBE; and
  deciding from the realm information to insert the media relay.

7. The apparatus of claim 1, the network address translation server operable to provide one or more functions selected from: operating as a network address translation element, providing a virtual private network (VPN) interconnect function, providing address hiding, providing IPV4-IPV6 translation, and executing transcoding.

8. A method comprising:
  receiving an INVITE from a first endpoint, the INVITE comprising a preferred local address;
  determining, based on the preferred local address, that the first endpoint supports media optimization;
  generating a signaling message, the signaling message comprising both:
    (a) the preferred local address to allow the first endpoint and a second endpoint to perform the media optimization according to an ICE/TURN/STUN protocol if the second endpoint supports the media optimization; and
    (b) optimization information selected to facilitate performing the media optimization independently of the ICE/TURN/STUN protocol if the second endpoint does not support the media optimization;
  determining whether the second endpoint supports the media optimization based on a response to the signaling message;
  if the first endpoint and the second endpoint support the media optimization, facilitating, by a signaling path border element (SBE), a data path border element (DBE) to allow the first endpoint and the second endpoint to perform the media optimization according to the ICE/TURN/STUN protocol; and if the first endpoint or the second endpoint fail to support the media optimization, facilitating, by the SBE, insertion of a media relay into the DBE to perform the media optimization for the first endpoint and the second endpoint, the media relay inserted according to the optimization information and independently of the ICE/TURN/STUN protocol.

9. The method of claim 8, the media optimization comprising an interactive connectivity establishment (ICE) protocol media optimization.

10. The method of claim 8, the network address translation server comprising a traversal using relay network (TURN) address translation protocol server.

11. The method of claim 8, the determining whether the first endpoint supports media optimization further comprising:
receiving an INVITE from the first endpoint; and
if the INVITE fails to include a network address translation address, determine that the first endpoint fails to support the media optimization.

12. The method of claim 8, the facilitating insertion of the media relay into the DBE further comprising:
sending realm information to a second SBE operable to decide from the realm information to insert the media relay.

13. The method of claim 8, the facilitating insertion of the media relay into the DBE further comprising:
receiving realm information from a second SBE; and
deciding from the realm information to insert the media relay.

14. The method of claim 8, the network address translation server operable to provide one or more functions selected from: operating as a network address translation element, providing a virtual private network (VPN) interconnect function, providing address hiding, providing IPV4-IPV6 translation, and executing transcoding.

15. Memory storing computer code, when executed by one or more processors, operable to:
receive an INVITE from a first endpoint, the INVITE comprising a preferred local address;
determine, based on the preferred local address, that the first endpoint supports media optimization;
generate a signaling message comprising both the preferred local address and optimization information, the preferred local address included to allow the first endpoint and a second endpoint to perform the media optimization according to an ICE/TURN/STUN protocol if the second endpoint supports the media optimization, the optimization information selected to facilitate performing the media optimization independently of the ICE/TURN/STUN protocol if the second endpoint does not support the media optimization;
determine whether the second endpoint supports the media optimization based on a response to the signaling message;
if the first endpoint and the second endpoint support the media optimization, facilitate, by a signaling path border element (SBE), a data path border element (DBE) to apply the ICE/TURN/STUN protocol to allow the first endpoint and the second endpoint to perform the media optimization; and
if the first endpoint or the second endpoint fail to support the media optimization, facilitate, by the SBE, insertion of a media relay into the DBE to perform the media optimization for the first endpoint and the second endpoint, the media relay inserted according to the optimization information and independently of the ICE/TURN/STUN protocol.

16. The memory of claim 15, the media optimization comprising an interactive connectivity establishment (ICE) protocol media optimization.

17. The memory of claim 15, the network address translation server comprising a traversal using relay network (TURN) address translation protocol server.

18. The memory of claim 15, the computer code operable to determine whether the first endpoint supports media optimization by:
receiving an INVITE from the first endpoint; and
if the INVITE fails to include a network address translation address, determine that the first endpoint fails to support the media optimization.

19. The memory of claim 15, the computer code operable to facilitate insertion of the media relay into the DBE by:
sending realm information to a second SBE operable to decide from the realm information to insert the media relay.

20. The memory of claim 15, the computer code operable to facilitate insertion of the media relay into the DBE by:
receiving realm information from a second SBE; and
deciding from the realm information to insert the media relay.

21. The memory of claim 15, the network address translation server operable to provide one or more functions selected from: operating as a network address translation element, providing a virtual private network (VPN) interconnect function, providing address hiding, providing IPV4-IPV6 translation, and executing transcoding.

* * * * *